United States Patent
Jorgensen et al.

[11] Patent Number: 6,064,009
[45] Date of Patent: May 16, 2000

[54] UNIVERSAL CABLE CLAMP HAVING OVAL APERTURES

[75] Inventors: Robert W. Jorgensen, Niles, Mich.; Thomas E. Lewis, South Bend, Ind.; Richard D. Swanson, Niles, Mich.

[73] Assignee: Hubbell Incorporated, Orange, Conn.

[21] Appl. No.: 08/920,879

[22] Filed: Aug. 29, 1997

Related U.S. Application Data

[63] Continuation of application No. 08/538,605, Oct. 3, 1995, abandoned.

[51] Int. Cl.[7] .................................................. H01B 17/00
[52] U.S. Cl. ...................................... 174/135; 174/40 CC
[58] Field of Search ........................... 174/61, 64, 65 G, 174/65 SS, 65 R, 135, 40 CC, 17 CT, 50.6; 248/56; 403/397, 396; 24/135 R, 135 N, 135 A

[56] References Cited

U.S. PATENT DOCUMENTS

| | | | |
|---|---|---|---|
| 1,242,533 | 10/1917 | Duck | 174/64 |
| 1,277,876 | 9/1918 | Detwiler | 24/129 R |
| 1,288,902 | 12/1918 | Hyatt et al. | 285/194 |
| 1,295,249 | 2/1919 | Wulkan | 285/194 |
| 1,667,814 | 5/1928 | Morgenstern et al. | 285/129 |
| 1,708,827 | 4/1929 | Black et al. | 285/129 |
| 1,760,663 | 5/1930 | Rosenfield | 285/129 |
| 1,772,241 | 8/1930 | Calderwood | 285/128 |
| 1,822,128 | 9/1931 | Clayton | 174/65 R |
| 1,914,635 | 6/1933 | Goetzelman | 285/129 |
| 2,391,761 | 12/1945 | Winn | 285/382 |
| 2,457,235 | 12/1948 | Hoehn | 285/159 |
| 2,458,409 | 1/1949 | Paige | 285/162 |
| 2,556,977 | 6/1951 | Paige | 285/128 |
| 2,564,341 | 8/1951 | Paige | 285/162 |
| 2,706,647 | 4/1955 | Gillespie | 285/162 |
| 3,084,958 | 4/1963 | Appleton | 285/189 |
| 3,344,502 | 10/1967 | Maier | 29/417 |
| 3,410,582 | 11/1968 | Appleton | 285/128 |
| 3,476,411 | 11/1969 | Herbert et al. | 285/192 |
| 3,676,571 | 7/1972 | Rubinstein | 174/65 R |
| 3,783,176 | 1/1974 | Lund et al. | 174/65 R |
| 4,018,982 | 4/1977 | Svekis | 174/65 R |
| 4,082,915 | 4/1978 | Silver | 174/51 |
| 4,306,109 | 12/1981 | Nattel | 174/51 |
| 4,459,429 | 7/1984 | Docimo | 174/65 R |
| 5,013,872 | 5/1991 | Lockwood et al. | 174/65 R |
| 5,204,499 | 4/1993 | Favalora | 174/65 R |
| 5,308,026 | 5/1994 | Shaw | 248/63 |

FOREIGN PATENT DOCUMENTS 460762  11/1949  Canada .

OTHER PUBLICATIONS

Net Price Sheet–Section OB No. OB–541–Raco All–Steel Products–May 5, 1941.

*Primary Examiner*—Kristine Kincaid
*Assistant Examiner*—Kamand Cuneo
*Attorney, Agent, or Firm*—Jerry M. Presson; Thomas P. Hilliard; David L. Tarnoff

[57] ABSTRACT

A universal cable clamp for coupling a wide variety of electrical cables to an electrical box is capable of accepting metal or non-metallic sheathed cables. The cable clamp includes upper and lower clamping plates and a front wall having at least one opening for receiving the cable. The upper and lower clamping plates are coupled together by bendable coupling arms. A fastener extends through the upper and lower clamping plates and into the electrical box to deform the bendable coupling arms while the cable is clamped between the upper and lower clamping plates. The opening in the front wall in embodiments is oval-shaped and is dimensioned to allow a non-metallic sheathed cable to pass through, while preventing the metal sheath of a metal sheathed cable from passing through. The clamp provides a grounding connection of the metal cables and conduits. The cable clamp accommodates thick or thin steel and aluminum flex metal conduits, armored cable, metal clad cable and non-metallic cable.

16 Claims, 4 Drawing Sheets

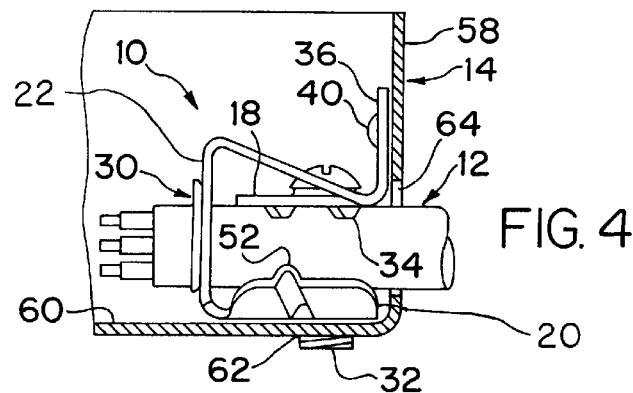
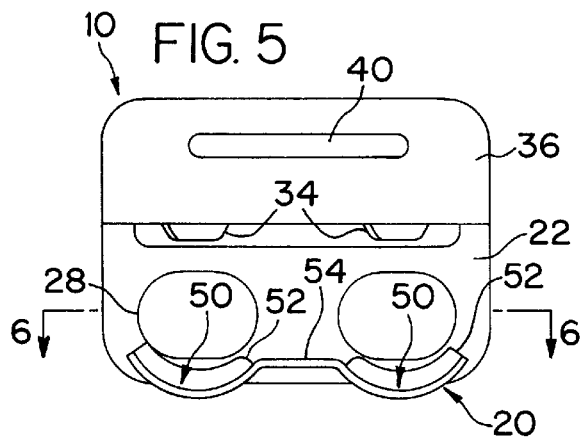
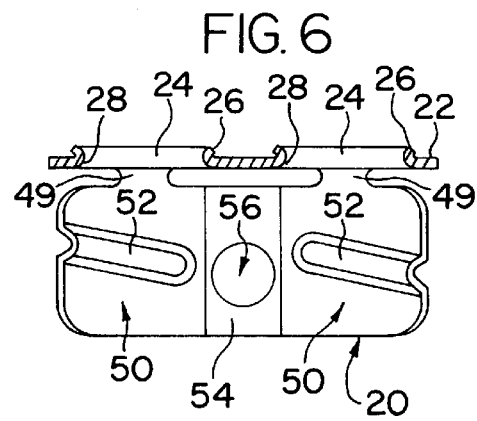
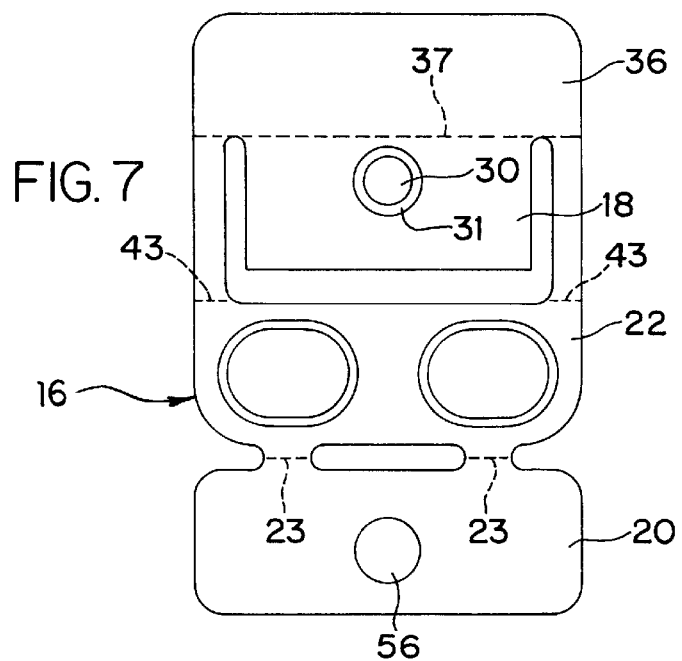

UNIVERSAL CABLE CLAMP HAVING OVAL APERTURES

This is a continuation of application Ser. No. 08/538,605, filed on Oct. 3, 1995, now abandoned.

FIELD OF THE INVENTION

The present invention is directed to a cable clamp for clamping a cable within an electrical box. More particularly, the invention is directed to a universal cable clamp for receiving and clamping plastic sheathed and metal sheathed electrical cables.

BACKGROUND OF THE INVENTION

Electrical cables are commonly supplied to an electrical junction box for connecting the cable to electrical fixtures or other electrical cables. The cables generally pass through an opening in the wall of the electrical box and are secured in place by a suitable clamp. Conventional cable clamps generally clamp the cable between a clamping plate and a side wall or bottom of the electrical box. A disadvantage of this type of clamping arrangement is that the wall of the electrical box is generally smooth and not able to adequately grip and clamp the cable in place.

Numerous cable clamping devices are known for clamping electrical cables to an electrical box. One form of cable clamp includes two opposing surfaces for gripping a cable therebetween. One example of a cable clamp is disclosed in U.S. Pat. No. 5,013,872 to Lockwood et al. One disadvantage of this type of cable clamp is that it is not able to accommodate all types of electrical cables having plastic and metal protective sheaths. In addition, the protective sheath must be removed from the larger non-metallic cables so that the electrical wires can be passed through the cable clamp into the electrical box, since the protective sheath will not pass through the cable clamp.

Other cable clamps are produced which are able to accommodate metal armor cable and plastic sheathed cable. These devices typically include an end stop for the metal armor such that a portion of the armor must be removed to allow the wires to pass through the stop. Since the plastic sheathed cables generally do not use an end stop, the end stop must be removed before the cable is passed through the device, thereby creating an additional step before the clamp can be used. Accordingly, there is a continuing need in the art for a cable clamp which can effectively clamp a cable to an electrical box without the need to remove the end stop when used with the non-metallic cables.

SUMMARY OF THE INVENTION

Accordingly, it is a primary object of this invention to provide a universal cable clamp capable of securely clamping many different kinds of electrical cables and electrical conduits.

Another object of the invention is to provide a cable clamp that can be installed quickly and easily.

Another object of the invention is to provide a universal cable clamp that is able to accommodate plastic or metal sheathed electrical cables without modification of the cable clamp or the electrical cable prior to use.

Another object of the invention is to provide a cable clamp that is simple and inexpensive to manufacture and that is readily attached to a standard electrical box.

The foregoing objects are basically attained by providing a cable clamp for clamping an electrical cable extending through an opening in an electrical connection box, and retaining the cable within the electrical connection box; the cable clamp comprising a lower clamping plate having a first edge for positioning adjacent the opening in the electrical connection box, and a second end opposite the first edge; an upper clamping plate having a first edge for positioning adjacent the opening in the electrical connection box, a second free edge opposite the first edge, and a flange coupled to the first edge and extending perpendicular to the upper clamping plate; a front wall coupled to the second edge of the lower clamping plate and extending perpendicular thereto, the front wall having at least one oval aperture having a width dimensioned for receiving a sheathed electrical cable passing therethrough, and a collar encircling the at least one aperture and extending outwardly from the front wall in the direction opposite the lower clamping plate; bendable coupling means coupling the upper clamping plate to the lower clamping plate, and fastener means for fastening the cable clamp to the electrical connection box and for clamping the cable between the upper and lower clamping plates.

The foregoing objects of the invention are further attained by providing a cable clamp for clamping an electrical cable extending through an opening in an electrical connection box, the cable clamp comprising a lower clamping plate having a first edge for positioning adjacent the opening in the electrical connection box, and a second end opposite the first edge; an upper clamping plate having a first edge aligned with the first edge of said lower clamping plate, and a second end opposite the first end; a front wall coupled to the second end of the lower clamping plate and extending substantially perpendicular thereto, the front wall including at least one aperture for receiving an electrical cable; bendable coupling means coupling the upper and lower clamping plates together, the coupling means including a first arm extending from the first edge of upper clamping plate to the first edge of the lower clamping plate, and a second arm extending from the first edge of the upper clamping plate to the first edge of said lower clamping plate; and fastener means for fastening the cable clamp to the electrical connection box and for clamping the cable between the upper and lower clamping plates.

The objects of the invention are further attained by providing a method of coupling a non-metallic or metal sheathed electrical cable to an electrical box, the method comprising attaching a cable clamp to a bottom wall of an electrical box adjacent an opening in a side wall of the electrical box, the cable clamp including, a lower clamping plate having a first edge for positioning adjacent the opening in the electrical connection box, and a second end opposite the first edge, an upper clamping plate having a first edge for positioning adjacent the opening in the electrical connection box, a second free edge opposite the first edge, and a flange coupled to the first edge and extending perpendicular to the upper clamping plate, a front wall coupled to the second edge of the lower clamping plate and extending perpendicular thereto, the front wall having at least one oval aperture having a width dimensioned for receiving a sheathed electrical cable passing therethrough and a height dimension for abutting a metal sheathed cable, and a collar encircling the at least one aperture and extending outwardly from the front wall in the direction opposite the lower clamping plate; bendable coupling means coupling the upper clamping plate to the lower clamping plate, fastener means for fastening the cable clamp to the electrical connection box and for clamping the cable between the upper and lower clamping plates, passing the electrical cable through the opening in the electrical box and between the upper and lower clamping plates, and tightening the fastener means and clamping the cable between the upper and lower clamping plates.

Other objects, advantages and salient features of the invention will become apparent from the following detailed description which, taken in conjunction with the annexed drawings, discloses preferred embodiments of the invention.

BRIEF DESCRIPTION OF THE INVENTION

Referring now to the drawings which form a part of this original disclosure:

FIG. 4 is a side elevational view of the cable clamp and electrical cable in accordance with the first embodiment in the clamped position with the electrical box shown in cross section;

FIG. 5 is a rear side elevational view of the cable clamp in the first embodiment;

FIG. 6 is a cross-sectional view of the cable clamp taken along line 6—6 of FIG. 5;

FIG. 7 is a top plan view of the blank for forming the cable clamp of FIGS. 1–6;

DETAILED DESCRIPTION OF THE INVENTION

Figure 1:
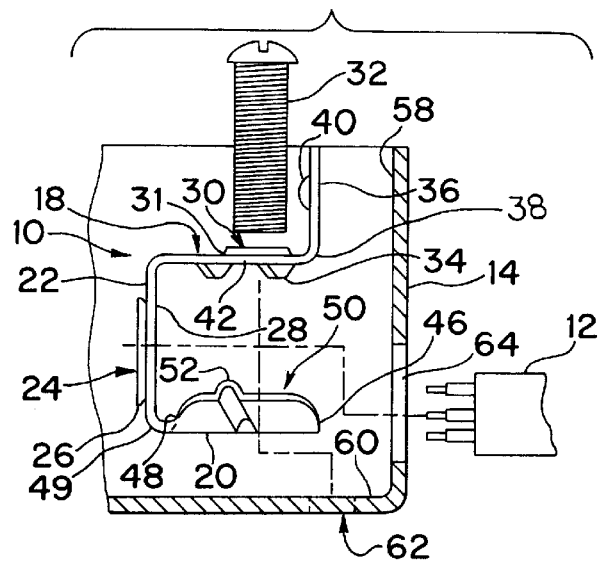
FIG. 1 is an exploded side elevational view of the cable clamp and electrical cable with the electrical box shown in cross section in accordance with a first embodiment of the invention.

Referring to FIGS. 1–7, the present invention is directed to a universal cable clamp 10 for securing an electrical cable 12 or electrical conduit within an electrical connection box 14. Cable clamp 10 fixes the position of electrical cable 12 with respect to box 14 to resist torsional and longitudinal movement of the cable.

Cable clamp 10 as shown in FIGS. 1–6 includes an upper clamping plate 18, and a lower clamping plate 20 substantially parallel thereto. In the embodiment of FIGS. 1–6, upper clamping plate 18 and lower clamping plate 20 are coupled together by a front wall 22.

Front wall 22 includes at least one and preferably two apertures 24 dimensioned to receive electrical wires from electrical cable 12 or to receive the entire cable as discussed hereinafter. In preferred embodiments, apertures 24 in front wall 22 are punched holes to form an outwardly extending collar 26 encircling the opening. Apertures 24 formed by punching outwardly provide a smooth inner surface 28 in the feed direction of electrical cable 12 to allow the wires of the cable to easily pass through aperture 24 without interference or damaging the electrical insulation. Collar 26 can be formed with a turned or curled edge as shown in the cross-sectional view of FIG. 6 to eliminate sharp edges which can damage the electrical insulation of the cable. Alternatively, apertures 24 can be formed by cutting in a manner to eliminate all sharp edges which can damage the electrical cable.

Figure 3:
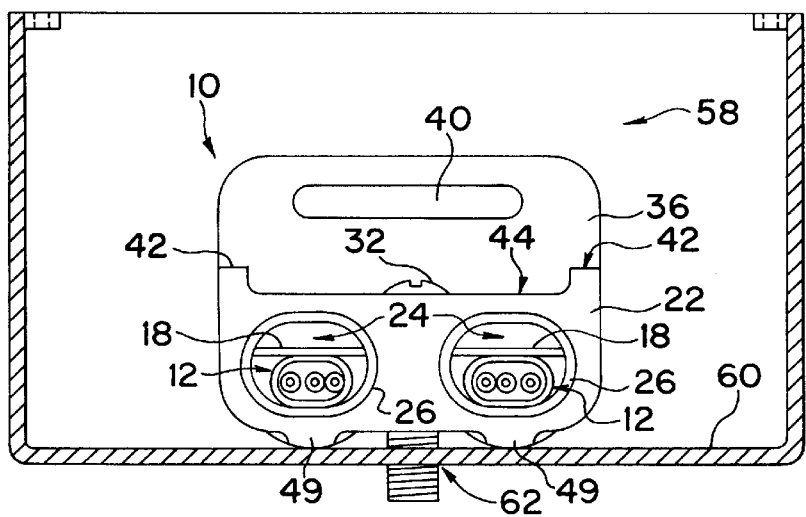
FIG. 3 is a front side elevational view of the cable clamp and electrical cable in accordance with the first embodiment of FIGS. 1 and 2 with the electrical box shown in cross section.

Referring to FIG. 3, apertures 24 in a preferred form of the invention have a substantially oval shape having the major axis of the oval in the transverse dimension of cable clamp 10. Apertures 24 are dimensioned to accommodate a variety of standard size electrical cables and a variety of insulating and protective sheaths. Apertures 24 have a width dimension along the major axis and a height dimension along the minor axis of the oval shape to allow standard size round, flat and oval electrical non-metallic cables to pass completely through the cable clamp without having to remove the insulating or protective sheath and without modifying the cable clamp by removing front wall 22. The height of apertures 24 is dimensioned to prevent standard metal armored cable from passing through while allowing the electrical wires to pass through. In this manner, front wall 22 functions as a stop for the metal armor with only the electrical wires passing through apertures 24 into the electrical box as shown in FIG. 4 and as discussed hereinafter in greater detail. Apertures 24 in front wall 22 have a height which can easily accept a plastic sheathed electrical cable with the cable and protective sheathing passing through apertures 24 without the need to first strip the protective sheathing from the cable.

Cable clamp 10 of the invention is compatible with standard gauge metal armor cable, such as BX-type cable and vinyl sheathed cables such as that sold under the tradename Romex. Cable clamp 10 is particularly suitable for standard 12 and 14 gauge cable. In addition, cable clamp 10 is able to clamp metal and plastic conduit through which electrical cables are fed. The clamp also electrically connects the metal cable or conduits to the box to provide a ground path.

Figure 2:
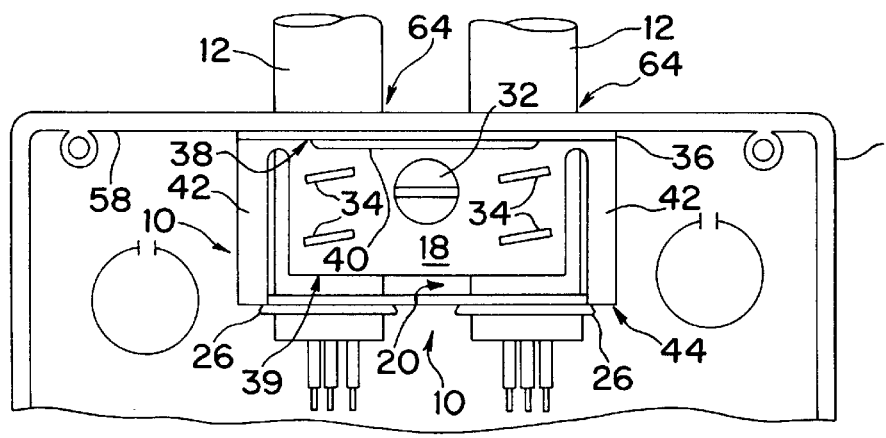
FIG. 2 is a partial top plan view of the cable clamp and electrical cable clamped to the electrical box in the first embodiment.

Upper clamping plate 18 as shown in FIG. 2 has a substantially rectangular shape and includes a centrally disposed aperture 30 for receiving a fastener such as a standard threaded screw 32. In the embodiment illustrated, aperture 30 is an upwardly punched hole to form a collar 31 to abut the head of screw 32. On opposite sides of aperture 30 are embossed ribs 34 disposed diagonally with respect to a longitudinal dimension of upper clamping plate 18 for gripping electrical cable 12. Preferably, ribs 34 are formed at an angle for engaging the helical ribs of a standard corrugated metal armor cable. Similarly, ribs 34 are able to grip the plastic sheath of a cable by slightly deforming or indenting the sheath. Preferably, two spaced apart ribs 34 are provided on each side of aperture 30 with ribs 34 being positioned on upper clamping plate 18 such that ribs 34 engage cables 12 as seen in FIG. 2.

Upper clamping plate 18 further includes an upwardly extending flange 36 coupled to a first end 38 of upper clamping plate 18. As shown in FIG. 1, flange 36 extends substantially perpendicular to upper plate 18 and includes an embossed area 40 to stiffen the flange. Embossed area 40 extends transversely with respect to cable clamp 10 as shown in FIG. 3 and is defined by a convex portion extending outwardly in the direction of upper clamping plate 18. Flange 36 covers box pry-out opening 64. As screw 32 is tightened, the upper clamping plate 18 as well as flange 36 slides down the inside box wall 58. Flange 36 strengthens upper clamping plate 18 and prevents or reduces twisting or deforming of first end 38 of upper clamping plate 18 when clamping pressure is applied to the electrical cables by screw 32. Upper clamping plate 18 terminates at a second free end 39 which, as shown, does not include a stiffening flange, whereby some bending may occur along the second end when clamping pressure is applied by screw 32.

As shown in FIG. 3, flange 36 has a width slightly greater than upper clamping plate 18 and extends along first edge 38 of upper clamping plate 18. The side edges of flange 36 adjacent the opposite corners of upper clamping plate 18 along first edge 38 are connected to a first end of bendable connecting arms 42. A second end of each connecting arm 42 is connected to an upper edge 44 adjacent the corners of front wall 22. Connecting arms 42 have a width to securely couple flange 36 and upper clamping plate 18 to front wall 22 while permitting upper clamping plate 18 to bend with respect to front wall 22 by the clamping force produced by screw 32. In other words, when screw 32 is tightened down as seen in FIG. 4, connecting arms 42 only bends at their ends, i.e., at fold lines 37 and 43 which are illustrated in FIG. 7.

Lower clamping plate 20 includes a first free edge 46 and second edge 48 substantially parallel thereto. Second edge 48 is coupled to front wall 22 by a pair of spaced apart connecting legs 49. As shown in FIG. 1, lower clamping plate 20 is substantially perpendicular to front wall 22 and parallel to upper clamping plate 18.

Lower clamping plate 20 includes at least one and preferably two substantially U-shaped recessed areas 50 dimensioned to receive and locate electrical cable 12. U-shaped recessed areas 50 are provided with at least one diagonal rib 52 formed in the sheet material is located below ribs 34 of upper clamping plate 18 as seen in FIGS. 1 and 7. Ribs 34, 52 are dimensioned for engaging and gripping the outer sheath of an electrical cable. In particular, ribs 34 extend downwardly from upper clamping plate 18 and ribs 52 extend upwardly from lower clamping plate 20 so that ribs 34 and 52 will engage the outer sheath of an electrical cable. U-shaped recessed areas 50 are positioned on lower clamping plate 20 for engaging cables 12. A substantially flat portion 54 is provided for separating U-shaped recessed areas 50 and includes an aperture 56 for fastening screw 32. Aperture 56 is axially aligned with aperture 30 in upper clamping plate 18 so that screw 32 is able to extend directly through upper and lower clamping plates 18, 20 and into electrical box 14.

Cable clamp 10 is a unitary and integrally formed unit formed from a blank 16 cut or pressed from sheet metal or other rigid, bendable material as shown in FIG. 7. Front wall 22 is folded along fold line 23 to be substantially perpendicular to lower clamping plate 20. Connecting arms 42 are then folded along fold line 43 perpendicular to front wall 22 and stiffening flange 36 is folded along fold line 37 so that cable clamp 10 has the configuration substantially as shown in FIG. 1.

Referring to FIG. 4, cable clamp 10 provides a means for positively securing electrical cable 12 within electrical connection box 14. Cable clamp 10 is positioned within electrical connection box 14 adjacent a knockout or pry-out opening 64 through which the electrical cable can pass. Cable clamp 10 is positioned with flange 36 abutting the side wall 58 and with the lower clamping plate 20 in contact with the bottom wall 60 of electrical connection box 14. Screw 32 is then passed downwardly through axially aligned apertures 30 and 56 and into threaded hole 62 in bottom wall 60 to fasten cable clamp 10 to electrical connection box 14. Electrical cable 12 is then fed through opening 64 in side wall 58 and through cable clamp 10. U-shaped recessed areas 50 are aligned with opening 64 so that electrical cable 12 is easily guided through the clamp. In the embodiment shown in FIGS. 1–4, electrical cable 12 is a standard non-metallic cable which is passed completely through apertures 24 in front wall 22 to expose the desired amount of cable. Screw 32 is then tightened to compress cable clamp 10 by drawing upper clamping plate 18 toward lower clamping plate 20 until ribs 34, 52 of plates 18, 20, respectively, engage electrical cable 12 in a gripping manner. Connecting arms 42 bend at the ends thereof where arms 42 are coupled to front wall 22 and upper clamping plate 18 as shown in FIG. 4.

As screw 32 is being tightened, upper clamping plate 18 is maintained in a substantially parallel relationship with lower clamping plate 20 by flange 36 being in contact with side wall 58. Flange 36 also ensures a substantially uniform pressure is applied across the width of the first edge 38 of upper clamping flange 18 and to resist bending or twisting. As the clamping force is applied by the tightening of screw 32, ribs 34 and 52 effectively indent and grip the sheath of the electrical cable. Once the electrical cable is securely clamped in the electrical connection box, the electrical wires can then be connected to the desired location.

In further uses of the cable clamp 10, a metal conduit or metal armor sheath is clamped to the electrical box by passing the cable or conduit through the opening in the electrical connection box and into the cable clamp in the manner described above. However, instead of passing completely through the cable clamp, the height of aperture 24 in front wall 20 causes the metal conduit or sheath to abut the front wall 20 with only the electrical wires passing through the apertures 24. The cable clamp grips and secures the conduit or armor cable in the same manner as described above by tightening the screw or other fastener. The clamp also provides electrical continuity for grounding of the metal jacket.

Embodiment of FIGS. 8–13

A cable clamp 10' in accordance with an alternative embodiment of the invention is illustrated in FIGS. 8–13 and is similar to cable clamp 10 with the exception of bendable connecting arms 66' connecting upper clamping plate 18' and lower clamping plate 20' together. The remaining elements are substantially identical and are identified by the same reference number with the addition of a prime.

Figure 8:
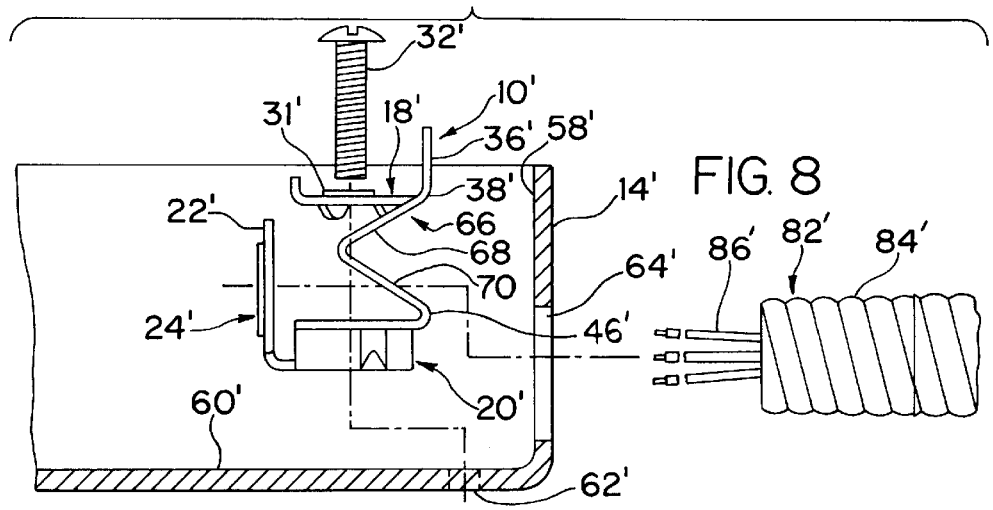
FIG. 8 is an exploded side elevational view of the cable clamp in a second embodiment with the electrical cable and showing the electrical box in cross section.
Figure 9:
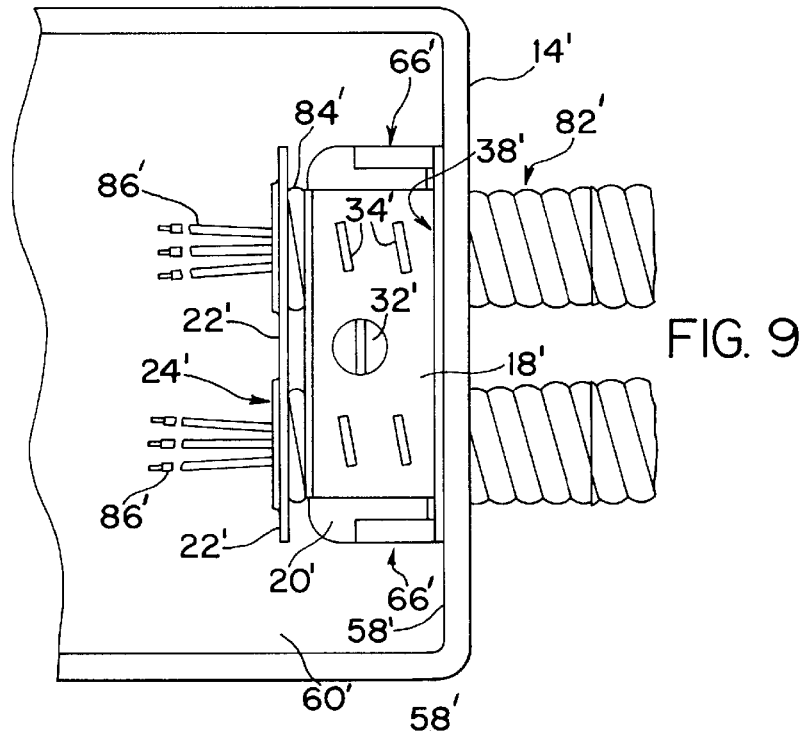
FIG. 9 is a top plan view of an assembly of the cable clamp of FIG. 8, electrical cable and electrical box.

As shown in FIG. 8, bendable connecting arms 66' have a substantially V-shape defining an upper leg 68' and a lower leg 70'. Upper leg 68' is coupled to the corner of upper clamping plate 18' along first edge 38'. Lower leg 70' is coupled to first edge 46' at the corner of lower clamping plate 20'. As seen, upper clamping plate 18' is connected directly to lower clamping plate 20' by connecting arms 66' rather than through front wall 22' as in the embodiment of FIGS. 1–6.

Figure 13:
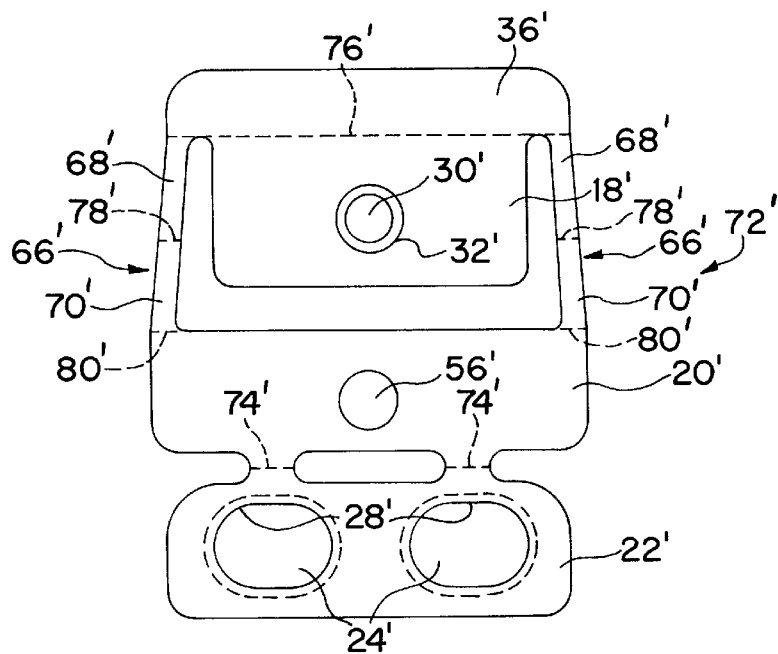
FIG. 13 is a top plan view of the blank for forming the cable clamp of FIGS. 8–12.

Clamping plate 10' is formed from a cut or punched blank 72' of sheet material as shown in FIG. 13. Front wall 22' is folded along fold lines 74' until perpendicular to lower clamping plate 20'. Flange 36' is folded along fold line 76' to be perpendicular to upper clamping plate 18'. Connecting arms 66' are then folded along fold lines 78' and 80' to form cable clamp 10' as shown in FIG. 8.

Figure 10:
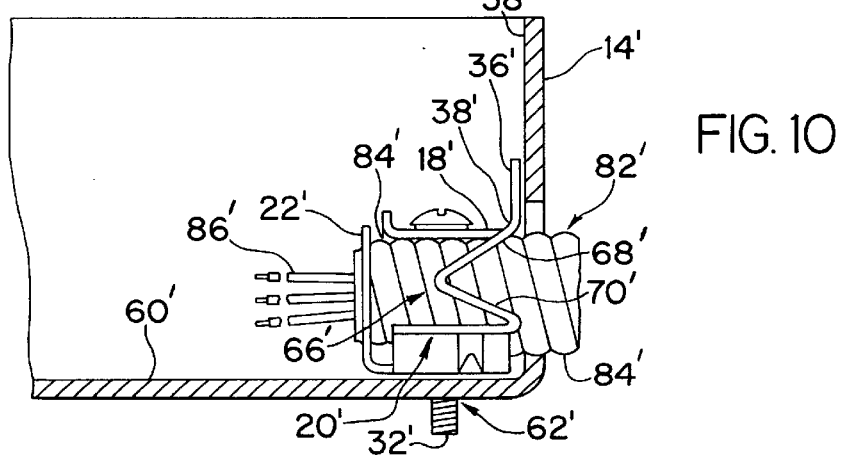
FIG. 10 is a side elevational view of the cable clamp of FIG. 8, electrical cable and electrical box which is shown in cross section.
Figure 11:
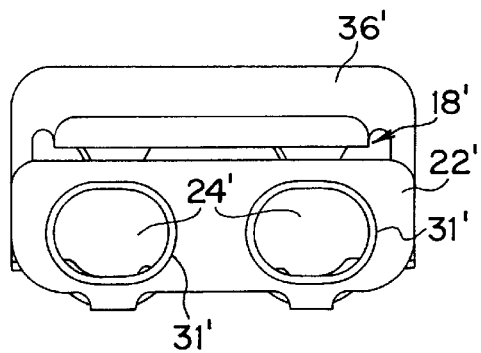
FIG. 11 is a front side elevational view of the cable clamp of FIG. 8 with the electrical cable removed.
Figure 12:
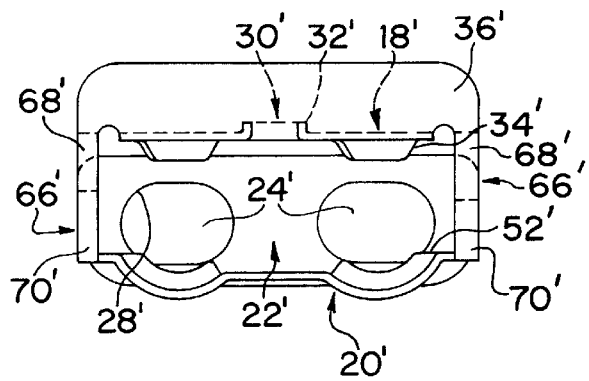
FIG. 12 is a rear side elevational view of the cable clamp of FIG. 8 with the electrical cable removed.

The use of cable clamp 10' is substantially the same as previously discussed. Cable clamp 10' is attached to electrical connection box 14' adjacent an opening for feeding an electrical cable 82' into the box. In this embodiment, the electrical cable is a corrugated metal sheathed BX-type cable. As shown, a portion of the metal sheath 84' is removed to expose a desired length of the electrical wires 86'. The electrical cable 82' is fed through opening 64' in side wall 58' of electrical connection box 14' and into cable clamp 10'. Electrical wires 86' are passed through apertures 24' until metal sheath 84' abuts front wall 22'. Screw 32' is then tightened to compress upper clamping plate 18' toward lower clamping plate 20' into gripping engagement with electrical cable 82'. As screw 32' is tightened, connecting arms 66' bend and fold in an accordion-like fashion as shown in FIG. 10.

While advantageous embodiments have been chosen to illustrate the invention, it will be understood by those skilled in the art that various changes and modifications can be made therein without departing from the scope of the invention as defined in the appended claims.

What is claimed is:

1. A universal cable clamp for clamping at least one electrical cable, of the standard non-metallic sheathed type or of the standard metal armor sheathed type, extending through an opening in an electrical connection box, and retaining said cable within said electrical connection box; said cable clamp comprising:

a lower clamping plate having a first edge for positioning adjacent the opening in the electrical connection box, and a second edge opposite said first edge;

an upper clamping plate having a first edge for positioning adjacent the opening in the electrical connection box, a second edge opposite said first edge, and a flange coupled to said first edge and extending perpendicular to said upper clamping plate;

a front wall coupled to said second edge of said lower clamping plate and extending perpendicular thereto, said front wall having at least one non-circular, oval shaped aperture having a width dimensioned for receiving a standard non-metallic sheathed electrical cable with a plurality of conductors therethrough and a height dimensioned for abutting a metal armor sheath of a standard metal armor sheathed cable with a plurality of conductors to allow the conductors of the metal armor sheathed cable to pass through said aperture and to prevent the metal armor sheath from passing through said aperture, and a collar encircling said at least one aperture and extending outwardly from said front wall in the direction opposite said lower clamping plate;

bendable coupling means coupling said upper clamping plate to said lower clamping plate; and fastener means for fastening said cable clamp to the electrical connection box and for clamping the cable between said upper and lower clamping plates.

2. The cable clamp of claim 1, wherein said bendable coupling means comprises a first bendable arm coupled to said flange at a first side and extending to an upper edge of said front wall, and a second bendable arm coupled to said flange at a second side and extending to said upper edge of said front wall.

3. The cable clamp of claim 1, wherein said bendable coupling means comprises a first bendable arm coupled to a first side of said flange and extending to said first edge of said lower clamping plate; and a second bendable arm coupled to a second side of said flange and extending to said first edge of said lower clamping plate.

4. The cable clamp of claim 3, wherein said first and second bendable arms have a substantially V-shape.

5. The cable clamp of claim 1, wherein said front wall includes a second oval shaped aperture, said second aperture having a height and width to allow a plastic sheathed cable to pass through and being dimensioned so that said front wall abuts a metal sheath of a metal sheathed cable.

6. The cable clamp of claim 1, wherein said lower clamping plate includes a central aperture for receiving said fastener means, and two substantially U-shaped recesses with one of said recesses receiving the cable and the other of said recesses receiving a second cable, each of said recesses including a raised rib extending across said recess for gripping the cables respectively.

7. The cable clamp of claim 6, wherein said upper clamping plate has a central aperture for receiving said fastening means and being aligned with said aperture in said lower clamping plate, and at least one gripping rib on opposite sides of said aperture for gripping the cable.

8. The cable clamp of claim 1, wherein said flange includes an embossed section for stiffening said flange.

9. A universal cable clamp for clamping at least one electrical cable, of the standard non-metallic sheathed type or of the standard metal armor sheathed type, extending through an opening in an electrical connection box, said cable clamp comprising a lower clamping plate having a first edge for positioning adjacent the opening in said electrical connection box, and a second edge opposite said first edge;

an upper clamping plate having a first edge aligned with the first edge of said lower clamping plate, and a second edge opposite the first edge;

a front wall having a first edge coupled to said second edge of said lower clamping plate and a second free edge, said front wall extending substantially perpendicular to said lower clamping plate and including at least one non-circular, oval shaped aperture for receiving said at least one electrical cable, said aperture having a width dimensioned to receive a standard non-metallic sheathed cable with a plurality of conductors therethrough a height dimensioned so that said front wall abuts a metal sheath of a standard metal sheathed cable with a plurality of conductors to allow the conductors of the metal armor sheathed cable to pass through said aperture and to prevent the metal armor sheath from passing through said aperture;

bendable coupling means coupling said upper and lower clamping plates together, said coupling means including a first arm extending from said first edge of said upper claiming plate at a first corner to said first edge of said lower clamping plate at a first corner, and a second arm extending from said first edge of said upper clamping plate at a second corner to said first edge of said lower clamping plate at a second corner; and fastener means for fastening said cable clamp to the electrical connection box and for clamping the cable between said upper and lower clamping plates.

10. The cable clamp of claim 9, wherein said first and second arms have a substantially V-shape.

11. The cable clamp of claim 9, further comprising a flange coupled to said first edge of said upper clamping plate and extending perpendicular thereto.

12. The cable clamp of claim 9, wherein said front wall includes a second non-circular, oval shaped aperture, said second aperture having a width to allow a non-metallic sheathed cable to pass through and a height so that said front wall engages a metal sheath of a metal sheathed cable.

13. The cable clamp of claim 12, wherein said front wall includes a collar encircling each of said apertures and extends outwardly away from said second edge of said lower clamping plate.

14. The cable clamp of claim 9, wherein said upper and lower clamping plates each include an aligned hole for receiving said fastening means.

15. The cable clamp of claim 9, wherein said lower clamping plate includes two substantially U-shaped recesses with one of said recesses receiving the cable and the other of said recesses for receiving a second electrical cable, each of said recess including a gripping rib extending across said recess for gripping the cables respectively.

16. The cable clamp of claim 15, wherein said upper clamping plate includes at least one gripping rib positioned above each of said U-shaped recesses for gripping the cables.

* * * * *